United States Patent [19]

Watanabe et al.

[11] Patent Number: 5,680,186
[45] Date of Patent: Oct. 21, 1997

[54] LIQUID CRYSTAL DISPLAY DEVICE WITH MICROLENSES HAVING A FOCAL POINT BETWEEN A COVER LAYER AND THE LIQUID CRYSTAL LAYER'S CENTER

[75] Inventors: Noriko Watanabe; Hiroshi Hamada, both of Nara; Fumiaki Funada, Yamatokoriyama, all of Japan

[73] Assignee: Sharp Kabushiki Kaisha, Osaka, Japan

[21] Appl. No.: 219,734

[22] Filed: Mar. 28, 1994

Related U.S. Application Data

[63] Continuation of Ser. No. 914,047, Jul. 13, 1992, abandoned, which is a continuation of Ser. No. 660,619, Feb. 25, 1991, abandoned.

[30] Foreign Application Priority Data

Feb. 26, 1990 [JP] Japan .................. 2-046868

[51] Int. Cl.⁶ .................. G02F 1/1335; G02F 1/1333
[52] U.S. Cl. .................. 349/95; 349/122; 349/137
[58] Field of Search .................. 350/334, 339 R, 350/345; 359/40, 74, 82; 349/95, 122, 137, 158

[56] References Cited

U.S. PATENT DOCUMENTS

| | | | |
|---|---|---|---|
| 3,622,224 | 11/1971 | Wysocki et al. | 359/53 |
| 3,680,950 | 8/1972 | Haas et al. | 359/84 |
| 3,697,150 | 10/1972 | Wysocki | 359/84 |
| 4,470,668 | 9/1984 | Inoue et al. | 359/82 |
| 4,534,622 | 8/1985 | Harada et al. | 350/334 |
| 4,626,303 | 12/1986 | Ogura | 359/80 |
| 4,709,991 | 12/1987 | Hoshikawa | 359/82 |
| 4,790,632 | 12/1988 | Miyakawa et al. | 350/334 |
| 4,793,691 | 12/1988 | Enomoto et al. | 359/82 |
| 4,836,652 | 6/1989 | Oishi et al. | 350/334 |
| 4,884,876 | 12/1989 | Lipton et al. | 359/64 |
| 4,963,002 | 10/1990 | Tagusa et al. | 359/88 |
| 4,985,285 | 1/1991 | Ichikawa et al. | 359/82 |
| 5,029,985 | 7/1991 | Suzuki et al. | 359/53 |
| 5,052,783 | 10/1991 | Hamada | 359/54 |
| 5,054,890 | 10/1991 | Hanyu et al. | 359/81 |
| 5,056,896 | 10/1991 | Iimura et al. | 359/92 |
| 5,064,697 | 11/1991 | Takiguchi et al. | 359/76 |
| 5,078,475 | 1/1992 | Sekimura et al. | 359/68 |
| 5,089,904 | 2/1992 | Fergason | 359/51 |
| 5,101,279 | 3/1992 | Kurematsu et al. | 359/40 |
| 5,150,138 | 9/1992 | Nakanishi et al. | 359/40 |
| 5,151,801 | 9/1992 | Hiroshima | 359/40 |

FOREIGN PATENT DOCUMENTS

| | | | |
|---|---|---|---|
| 60-130719 | 7/1985 | Japan . | |
| 0165622 | 8/1985 | Japan | 359/40 |
| 0165623 | 8/1985 | Japan | 359/40 |
| 0165624 | 8/1985 | Japan | 359/40 |
| 60-165621 | 8/1985 | Japan . | |
| 60-165622 | 8/1985 | Japan . | |
| 60-165623 | 8/1985 | Japan . | |
| 60-165624 | 8/1985 | Japan . | |
| 0062131 | 12/1985 | Japan | 359/41 |
| 61-112128 | 5/1986 | Japan . | |
| 0094826 | 5/1987 | Japan | 350/334 |
| 62-229222 | 10/1987 | Japan . | |
| 0118125 | 5/1988 | Japan | 350/334 |
| 0222221 | 9/1989 | Japan | 350/334 |
| 2-1816 | 1/1990 | Japan . | |
| 2-228626 | 9/1990 | Japan . | |
| 2-302726 | 12/1990 | Japan . | |

Primary Examiner—Anita Pellman Gross
Attorney, Agent, or Firm—David G. Conlin; Brian L. Michaelis

[57] ABSTRACT

Disclosed is a liquid crystal display device which comprises first and second transparent substrates disposed one above the other, and a liquid crystal layer disposed therebetween and having pixels. The second transparent substrate includes a microlens array therein, which has microlenses for converging light on the respective pixels. The microlenses are so positioned that their focal points are located in the vicinity of the inner surface of the second transparent substrate, which is the surface on the side provided with the liquid crystal layer. Since the microlens array is included in one of the two transparent substrates, the focal length of each microlens can be made shorter, resulting in an improved effective aperture ratio.

9 Claims, 1 Drawing Sheet

LIQUID CRYSTAL DISPLAY DEVICE WITH MICROLENSES HAVING A FOCAL POINT BETWEEN A COVER LAYER AND THE LIQUID CRYSTAL LAYER'S CENTER

This is a continuation of application Ser. No. 07/914,047 filed on Jul. 13, 1992, now abandoned, which is a continuation of application Ser. No. 07/660,619 filed on Feb. 25, 1991, now abandoned.

BACKGROUND OF THE INVENTION

1. Field of the Invention

The present invention relates to a high-resolution liquid crystal display device with an improved effective aperture ratio.

2. Description of the Prior Art

The demand for liquid crystal panels has been increased and nowadays they are widely used not only as a direct vision type display device but also as a projection type display device such as a projection television. When a conventional liquid crystal panel having a small number of pixels is used as the projection type display device, low resolution of the display screen becomes noticeable if magnification is increased. In order to obtain a clear image even at high magnification, it is necessary to increase the number of pixels in the liquid crystal panel.

If the number of pixels in the liquid crystal panel is increased, however, the ratio of the area occupied by portions other than the pixels to that occupied by the pixels is increased, i.e., the area of a black mask which covers these portions is increased, particularly in the case of an active matrix type liquid crystal panel. The increase in the area of the black mask reduces the total area of the pixels which contribute to the creation of a display image, thereby decreasing the aperture ratio of the display device. This makes the display screen dark, resulting in lowered image quality.

In order to prevent the decrease in the aperture ratio, it has been proposed that a microlens array be formed on one side of a liquid crystal panel (Japanese Laid-Open Patent Publication Nos. 60-165621 to 60-165624). The microlens array has microlenses corresponding to the pixels of the liquid crystal panel, so that the light which has been blocked by the black mask in a conventional display device can be converged on the respective pixels.

A microlens has been used as a converging lens for an optical pickup device such as a laser disk, a compact disk or a magneto-optic disk; a converging lens for coupling an optical fiber to a light emitting element or to a light receiving element; a coupling device for a one-dimensional image sensor or for an LED printer; and a converging device for improving the effective aperture ratio of a two-dimensional solid-state image pickup device or of a liquid crystal panel. Methods currently used for fabricating microlenses are as follows: ion exchange (Appl. Optics 21 (6), p. 1052 (1984) or Electron Lett. 17, p. 452 (1981)), swelling ("New Method of Fabricating Plastic Microlenses" presented by Suzuki et al., at the 24th Micro-optics Research Conference), heat deformation (described by Zoran D. Popovic et al., in "Technique for monolithic fabrication of microlens arrays", Appl. Optics 27, p. 1281 (1988)), vapor deposition (Japanese Laid-Open Patent Publication No. 55-135808), heat transfer (Japanese Laid-Open Patent Publication No. 61-64158), machining, and the like.

In the ion exchange technique, voltage is applied to a substrate including ions while keeping the substrate in contact with another ion source. This brings about ion exchange which causes a refractive index distribution, thereby attaining a lens effect. In the swelling technique, a photosensitive monomer is polymerized by ultraviolet rays, which causes a difference in osmotic pressure between the UV-exposed portion and the non-exposed portion, thereby swelling the UV-exposed portion to obtain a convex lens. In the heat deformation technique, a film of photosensitive resin is formed in a circular shape by patterning, and then heated to a temperature equal to or higher than the melting point of the resin so as to be melted, resulting in surface tension by which the film is formed into a lens. In the vapor deposition technique, a vitreous substance is deposited by vapor deposition on a glass substrate having a round concave portion until the concave portion is filled with the vitreous substance. Thereafter, the thickness of the glass substrate is reduced into its original level, resulting in a lens. In the machining technique, a substrate is cut so as to be formed into a lens.

A planar microlens array having gradient index microlenses is obtained by the ion exchange technique and the vapor deposition technique, while a microlens array having hemispherical microlenses is obtained by the other techniques. In the fabrication of a microlens array having hemispherical microlenses, a mold is made on the basis of the microlens array first obtained and then other microlens arrays are fabricated by the use of the mold, thereby enabling the mass production of microlens arrays.

A microlens array fabricated by a method such as described above is affixed to a conventional liquid crystal panel so as to improve the effective aperture ratio thereof to obtain a bright display screen. However, there are limitations on improvement in the effective aperture ratio. Since light has a diffraction limit, the size of the spot of light to be formed by a microlens is determined by the diameter and the focal length of the microlens. The smaller the diameter of the microlens is and the longer its focal length is, the larger the size of the spot becomes. If the size of the spot is larger than the area of a pixel, the amount of light received by each pixel greatly decreases. This means that the amount of light utilized for the creation of a display image is greatly decreased, thereby decreasing the effective aperture ratio.

In order to converge light efficiently, the diameter of the microlens should be increased and the focal length thereof should be shortened. However, the diameter of the microlens cannot be made larger than the area of the pixel. Furthermore, there is a limit to the decrease in the focal length due to the following reason: As described above, a microlens array is attached to one side of a liquid crystal panel, which comprises a pair of substrates and a liquid crystal layer disposed therebetween, i.e., the microlens is attached to the outer surface of one of the two substrates. Each microlens of the microlens array has its focal point located in the vicinity of the inner surface of the substrate with the microlens array on its outer surface, which inner surface faces the liquid crystal layer. This means that the microlenses and their focal points are positioned substantially on opposite sides of the substrate. Thus, the focal length of each microlens cannot be made equal to or smaller than the thickness of this substrate. The thickness of a glass substrate used in the liquid crystal panel is approximately 1 mm. Even if the glass substrate is made thinner, 0.5 mm is a limit to practical applications. Thus, the focal length of the microlens cannot be made 0.5 mm or less. In a high-resolution liquid crystal panel in which the pitch of the arrangement of pixels is several tens of micrometers, the size of the spot becomes larger than that of each pixel. This decreases the effective aperture ratio of the liquid crystal panel, resulting in a dark display screen.

SUMMARY OF THE INVENTION

The liquid crystal display device of this invention, which overcomes the above-discussed and numerous other disadvantages and deficiencies of the prior art, comprises: a first transparent substrate and a second transparent substrate disposed one above the other; and a liquid crystal layer which is disposed between said first and second transparent substrates and has pixels formed therein, wherein said second transparent substrate includes a microlens array therein, the microlens array having microlenses for converging light on the respective pixels, the microlenses being so positioned that their focal points are located in the vicinity of the inner surface of the second transparent substrate, said inner surface of the second transparent substrate facing the liquid crystal layer.

In a preferred embodiment, the second transparent substrate further includes a plastic film on the side provided with the liquid crystal layer.

In another preferred embodiment, the second transparent substrate further includes a glass plate on the side provided with the liquid crystal layer.

In a further preferred embodiment, each of the microlenses of the microlens array is a convex lens.

In a further preferred embodiment, the microlens array is a planar microlens array, the microlenses of which are spherical gradient index microlenses.

In a further preferred embodiment, the planar microlens array is provided with a coating film.

Thus, the invention described herein makes possible the objective of providing a liquid crystal display device which includes microlenses each having a short focal length to efficiently converge light on the corresponding pixel, thereby attaining a large effective aperture ratio to obtain a bright display screen.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Example 1

Figure 1:
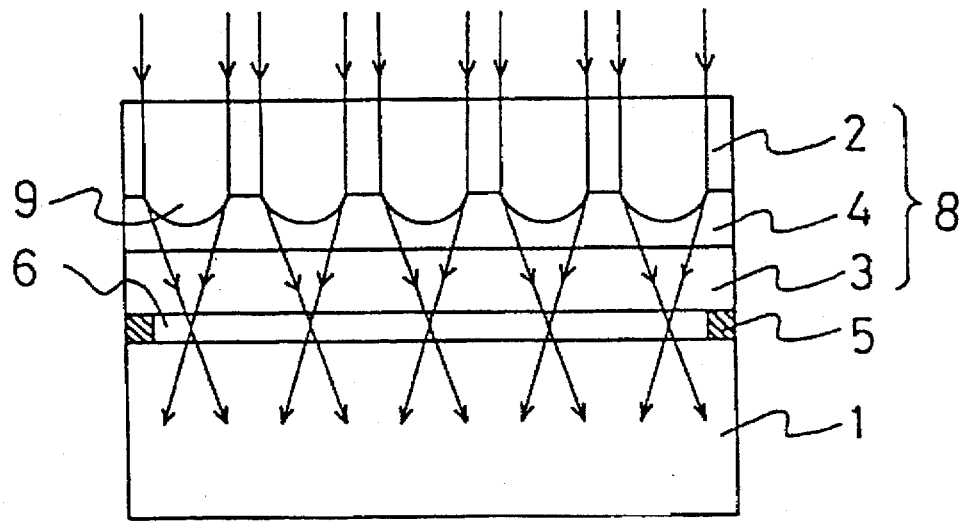
FIG. 1 is a cross sectional view showing a liquid crystal display device according to the invention.

FIG. 1 shows a liquid crystal display device according to the present invention. The liquid crystal display device of this example, which is of an active matrix type, comprises two transparent substrates 1 and 8 disposed one above the other. For convenience of explanation, the transparent substrate 1 is hereinafter referred to as a "first substrate 1" and the transparent substrate 8 as a "second substrate 8" in Example 1. The first substrate 1, which is made of bolosilicate glass, has pixel electrodes, switching devices, bus lines and the like formed thereon (not shown). Between the first and second substrates 1 and 8 is disposed a liquid crystal layer 6 sealed with a sealing material 5. The second substrate 8 includes a microlens array 2, an adhesive layer 4 and a plastic film 3. In the microlens array 2, microlenses 9 are so formed that they correspond to the pixel electrodes on the first substrate 1. In this example, each of the microlenses 9 is a convex lens.

The microlens array 2 can be fabricated by the above-described known methods such as swelling, heat deformation, heat transfer, and machining. In this example, the heat deformation technique is employed.

The plastic film 3 is affixed to the microlens array 2 by the adhesive layer 4. Adhesives made of transparent resins can be used for the adhesive layer 4. In this example, an ultraviolet-curing resin is used for the adhesive layer 4. Since there is a great difference in coefficient of thermal expansion between the microlens array 2 and the plastic film 3, it is not preferable to use a thermosetting resin for the adhesive layer 4. The adhesive layer 4 used in this example, however, need not be provided; the microlens array 2 and the plastic film 3 can be affixed to each other by another means.

It is preferable that the first substrate 1 is made of a material having approximately the same coefficient of thermal expansion as that of a substrate used for the fabrication of the microlens array 2. If there is a great difference in coefficient of thermal expansion between the first substrate 1 and the substrate for the fabrication of the microlens array 2, there arises a possibility that the resultant liquid crystal display device loses reliability when the temperature changes.

The plastic film 3 requires the following properties: optical transparency, isotropy or uniaxial orientation, excellent chemical resistance, low water absorption and low gas transmission. It is preferable to use polycarbonate, polysulfone, phenoxy ether resin, uniaxial polyester film or the like for fabricating the plastic film 3. In this example, a film made of polyethersulfonic acid resin having a thickness of 0.3 mm is used. The plastic film 3 may be surfaced with a coating to improve the reliability thereof. Furthermore, the plastic film 3 may be replaced with a glass plate having a thickness of 0.1 to 0.4 mm.

The thickness of the plastic film 3 is so determined that the back focal point of each of the microlenses 9 is located in the vicinity of the inner surface of the second substrate 8, i.e., the surface of the plastic film 3 on the side facing the liquid crystal layer 6, and preferably that the back focal point is located in the center of the liquid crystal layer 6. In cases where the adhesive layer 4 is not provided, the thickness of the plastic film 3 is determined by calculating the product of a back focal length $f_b$ of the microlens 9 and the refractive index n of the plastic film 3, which is accordingly represented by fb·n. Since the adhesive layer 4 is used in this example, the thickness of the plastic film 3 is determined in consideration of the refractive indices of both the adhesive layer 4 and the plastic film 3.

A transparent electrode (not shown) is formed on one side of the plastic film 3, which is the side provided with the liquid crystal layer 6. The transparent electrode may be formed before or after the microlens array 2 and the plastic film 3 are affixed to each other. Since the plastic film 3 has poor heat resistance, the transparent electrode is formed by low-temperature vapor deposition. Furthermore, the sealing material 5 and an orientation film which is formed on the transparent electrode are made of materials which can be cured at low temperatures and have excellent adhesion to the plastic film 3.

In this example, the microlens array 2 having the convex microlenses 9 is used, but a planar microlens array fabricated by ion exchange, vapor deposition or the like can also be used. In the ion exchange technique, a substrate used for the fabrication of the planar microlens array includes a large number of ions. This brings about a difference in coefficient of thermal expansion between the substrate for the fabrication of the planar microlens array and the first substrate 1 on which pixel electrodes, switching devices and the like are to be formed. Consequently, there is a possibility that the resultant liquid crystal display device loses reliability when the temperature changes. In order to prevent such deterioration, it is preferable that a material of high flexibility is used for a spacer which is included in the sealing material 5 or in the liquid crystal layer 6 so as to keep the thickness of the sealing material 5 and the distance between the first and second substrates 1 and 8 at a predetermined level.

In the liquid crystal display device of this example, the microlens array 2 having the microlenses 9 corresponding to the pixels is formed within the second substrate 8, so that the focal length of each of the microlenses 9 can be shortened. Consequently, the spot of light formed by each microlens 9 can be made smaller than the area of each pixel, thereby improving the effective aperture ratio of the liquid crystal display.

Example 2

Figure 2:
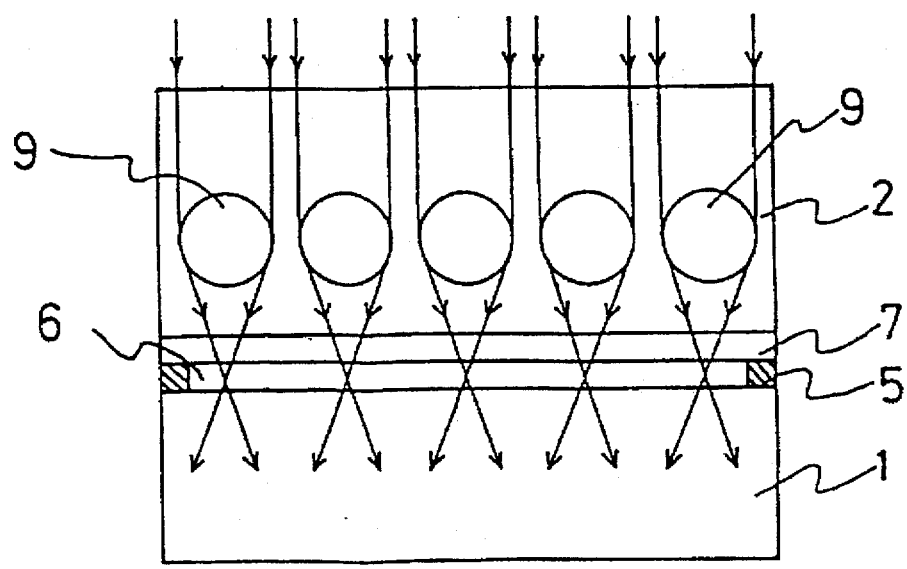
FIG. 2 is a cross sectional view showing another liquid crystal display device according to the invention.

FIG. 2 shows another liquid crystal display device according to the present invention. In this example, a planar microlens array 2 serves as the second substrate 8 of Example 1 shown in FIG. 1. In the same manner as in Example 1, pixel electrodes, switching devices, bus lines, which are not shown, are formed on the transparent substrate 1. The liquid crystal layer 6 is sealed with the sealing material 5 between the transparent substrate 1 and the planar microlens array 2. Furthermore, in this example, a coating film 7 is formed on the planar microlens array 2. The planar microlens array 2 has gradient index microlenses 9 formed therein. For the fabrication of the microlenses 9, spherical regions each having a distributed index are formed in a substrate made of soda glass. More specifically, hemispherical distributed index regions are first formed by the ion exchange technique in the glass substrate, and then provided with a coating, after which the substrate is subjected to ion exchange again, resulting in the microlenses 9 (Japanese Laid-Open Patent Publication No. 58-16745). The focal points of the microlenses 9 are located in the vicinity of the inner surface of the microlens array 2, i.e., the surface of the microlens array 2 on the side facing the liquid crystal layer 6. In this way, the microlens array 2 can be used as one of the two transparent substrates of a liquid crystal display device.

In this example, since the planar microlens array 2 is made of soda glass including a large number of ions, there is a possibility of ions moving from the microlens array 2 to the liquid crystal layer 6. In order to prevent such migration, the coating film 7 is formed on the surface of the planar microlens array 2.

Furthermore, since the substrate used for the fabrication of the microlens array 2 is made of soda glass, there is a difference in coefficient of thermal expansion between the transparent substrate 1 and the substrate for the fabrication of the microlens array 2. This causes a possibility that the resultant liquid crystal display device loses reliability when temperature changes. In order to prevent this deterioration, as described above, a material of high flexibility is used for a spacer which is included in the sealing material 5 or in the liquid crystal layer 6 so as to keep the thickness of the sealing material 5 and the distance between the transparent substrate 1 and the microlens array 2 at a predetermined level. Also for the purpose of attaining reliability, material used for the transparent substrate 1 has approximately the same coefficient of thermal expansion as that used for the microlens array 2.

In this example, the microlens array 2 serves as one of the two transparent substrates of the liquid crystal display device as described above, so that the focal length of each of the microlenses 9 can be shortened, which reduces the size of the spot of light to be formed by each microlens 9. Thus, even if the pixels are made so fine that the length of each side thereof is 100 μm or less, light can be efficiently converged on the pixels. This makes it possible to significantly improve the effective aperture ratio of the liquid crystal display device. In a liquid crystal display device which is constructed in the same manner as in this example and has a diagonal length of 3 inches with 1000×1500 dots, the effective aperture ratio is approximately 60%, which is twice as large as that of a conventional liquid crystal display device.

Although the microlens array 2 is fabricated by the ion exchange technique in this example, it can be fabricated using other methods. For example, the following method can be adopted: Holes are first made in a substrate by etching, and thereafter plastic or glass beads having a refractive index different from that of the substrate are placed in the holes, which are then covered with a resin having the same refractive index as that of the substrate, resulting in a microlens array (Appl. Opt. 25, pp. 3356 (1986)).

As described above, a liquid crystal display device of the present invention has microlenses each having a short focal length, thereby reducing the size of each spot of light to be formed by each microlens. The size of the spot can be kept smaller than that of the pixel. As a result, the effective aperture ratio of the liquid crystal display device can be significantly improved, thereby attaining a bright display screen.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A projection-type active matrix type liquid crystal display device, comprising:

an active matrix substrate having a plurality of pixel electrodes and switching elements for the plurality of pixel electrodes;

a microlens array including a plurality of microlenses;

a crystal layer between the active matrix substrate and the microlens array; and a cover layer covering the microlens array and having a transparent electrode on a surface facing the liquid crystal layer, the cover layer having a thickness in a range of from 0.1 mm to 0.4 mm, wherein a focal point of each of the plurality of microlenses is located between a center of the liquid crystal layer and a vicinity of a surface of the cover layer facing the liquid crystal layer, and a focal length of each of the plurality of microlenses is short enough to converge light to a spot area smaller than an area of each of the plurality of pixel electrodes.

2. A liquid crystal device according to claim 1, wherein each of the plurality of microlenses is a convex lens.

3. A liquid crystal device according to claim 1, wherein the microlens array is made of a plastic material.

4. A liquid crystal device according to claim 1, wherein the cover layer is made of a plastic material.

5. A liquid crystal device according to claim 1, wherein the cover layer is a glass plate.

6. A liquid crystal device according to claim 1, further including a coating layer on a surface of the cover layer facing the liquid crystal layer.

7. A liquid crystal device according to claim 1, wherein the cover layer is attached to the microlens array through an adhesive layer and thickness of the cover layer is determined as a function of the focal length of each of the plurality of microlenses and refractive indices of both the cover layer and the adhesive layer.

8. A liquid crystal device according to claim 7, wherein each of the plurality of microlenses of the microlens array is a convex lens.

9. A liquid crystal device according to claim 1, produced by a method comprising the steps of:

providing the cover layer on the microlens array;

forming the transparent electrode on the cover layer;

attaching the cover layer provided on the microlens array and the active matrix substrate so that the plurality of pixel electrodes face the transparent electrode with a gap between the cover layer and the active matrix substrate; and forming the liquid crystal layer in the gap.

* * * * *